US008589471B2

(12) United States Patent
Whitney et al.

(10) Patent No.: US 8,589,471 B2
(45) Date of Patent: Nov. 19, 2013

(54) DYNAMIC DISPATCH FOR DISTRIBUTED OBJECT-ORIENTED SOFTWARE SYSTEMS

(75) Inventors: Jonathan Whitney, Cambridge, MA (US); Alexander Vul, Palo Alto, CA (US); Mathew Connors, Half Moon Bay, CA (US); Johan Eriksson, Orebro (SE); Atanu Neogi, Brookline, MA (US)

(73) Assignee: BMC Software, Inc., Houston, TX (US)

( * ) Notice: Subject to any disclaimer, the term of this patent is extended or adjusted under 35 U.S.C. 154(b) by 248 days.

(21) Appl. No.: 13/074,540

(22) Filed: Mar. 29, 2011

(65) Prior Publication Data
US 2012/0254278 A1 Oct. 4, 2012

(51) Int. Cl.
*G06F 15/16* (2006.01)
(52) U.S. Cl.
USPC .......................................... 709/201
(58) Field of Classification Search
USPC .................................. 709/201, 204, 223, 224
See application file for complete search history.

(56) References Cited

U.S. PATENT DOCUMENTS

| | | | | |
|---|---|---|---|---|
| 5,826,000 | A * | 10/1998 | Hamilton | 714/4.1 |
| 6,236,999 | B1 * | 5/2001 | Jacobs et al. | 1/1 |
| 7,155,479 | B2 * | 12/2006 | Cover et al. | 709/203 |
| 7,353,017 | B2 * | 4/2008 | Chen et al. | 455/414.2 |
| 2006/0026141 | A1 * | 2/2006 | Brubacher et al. | 707/3 |
| 2007/0100971 | A1 * | 5/2007 | Hackmann | 709/220 |
| 2008/0091682 | A1 * | 4/2008 | Lim | 707/9 |
| 2009/0249440 | A1 * | 10/2009 | Platt et al. | 726/1 |
| 2009/0279123 | A1 * | 11/2009 | Sekine | 358/1.15 |
| 2010/0077095 | A1 * | 3/2010 | Wong et al. | 709/231 |
| 2010/0082621 | A1 * | 4/2010 | Krivopaltsev et al. | 707/736 |
| 2010/0246404 | A1 * | 9/2010 | Bradford et al. | 370/237 |
| 2011/0138466 | A1 * | 6/2011 | Ji et al. | 726/23 |
| 2011/0145365 | A1 * | 6/2011 | Beattie et al. | 709/219 |

FOREIGN PATENT DOCUMENTS

EP 1271990 A1 * 1/2003

OTHER PUBLICATIONS

Whitney, Jonathan. "Description and Analysis of Central Registry, a Pattern for Modular Implicit Invocation." Massachusetts Institute of Technology. May 2002. p. 1-83.

* cited by examiner

*Primary Examiner* — Hassan Phillips
*Assistant Examiner* — Siren Wei

(57) ABSTRACT

A provider definition represents software that implements the semantics of one or more operations on an object in an object-oriented system. A provider represents a specific instance of a provider definition. One or more providers implement operations for objects in the system. A component of the system called the provider registry maintains a mapping of providers and operations as defined by the provider definitions. When handling a request to invoke a operation on an object, the system dynamically dispatches to the correct provider based on this mapping. Where more than one provider are registered as implementing the desired operation on an object, techniques are disclosed for selecting a provider to perform the desired operation.

20 Claims, 6 Drawing Sheets

DYNAMIC DISPATCH FOR DISTRIBUTED OBJECT-ORIENTED SOFTWARE SYSTEMS

BACKGROUND

This disclosure relates generally to the field of computer software. More particularly, but not by way of limitation, it relates to a technique for controlling the processing of a software function.

A distributed software system is a software system whose functionality is distributed across a plurality of software components and computer nodes, or a system that is architected in a manner that it is capable of being distributed across a plurality of software components and computer nodes. One of the challenges in dealing with a distributed software system is deciding which software component and/or computer node should process a software function. Another major problem has been a difficulty in extending control functions without having to upgrade the entire system. There are many algorithms and architectures that enable distributed software systems. However, they are usually quite rigid and do not allow the system to adapt to new resource types, resource topologies, and larger scale.

DETAILED DESCRIPTION

Figure 1:
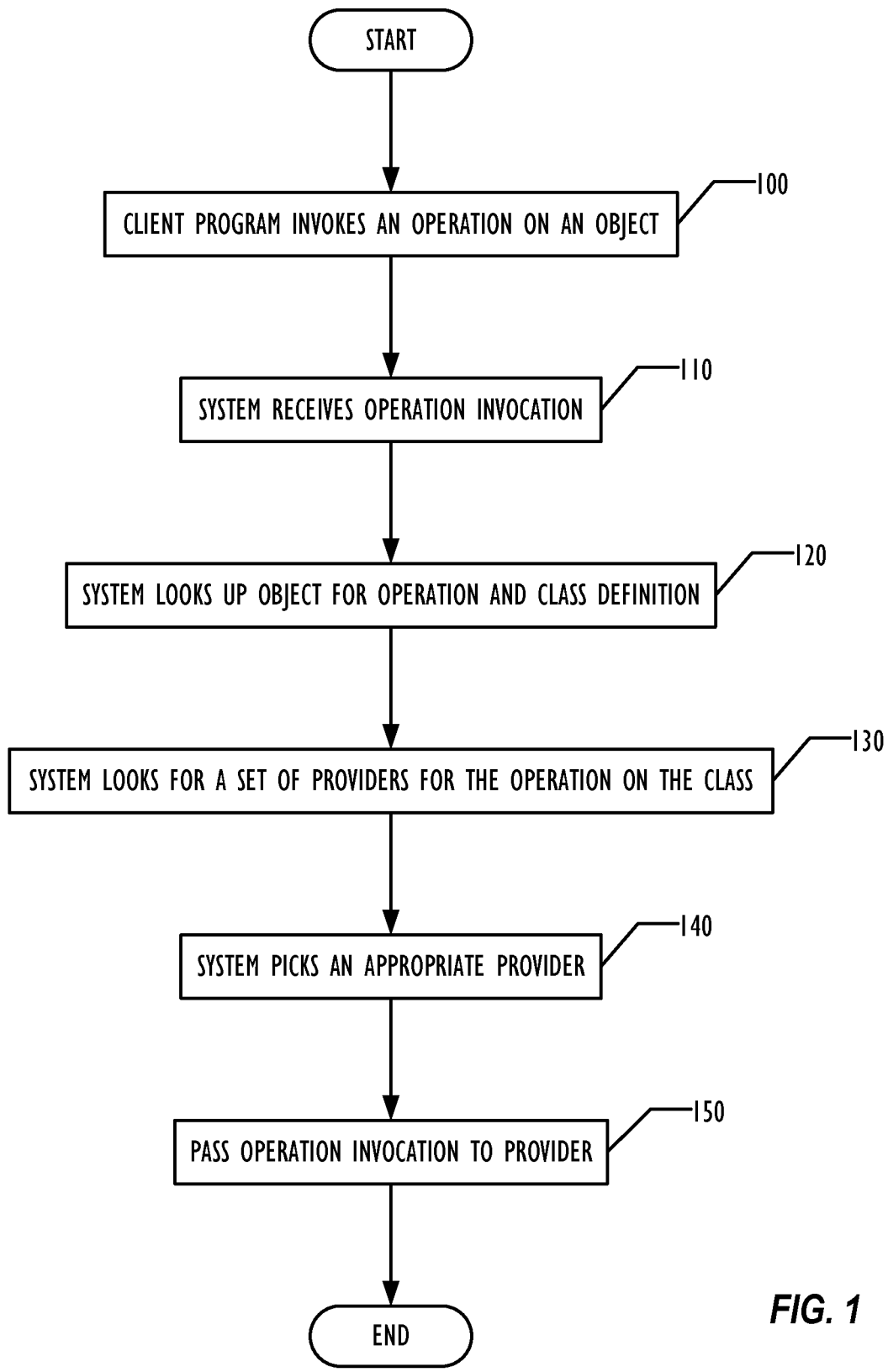
FIG. 1 is a flowchart illustrating a technique for dynamic dispatch according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The techniques disclosed herein allow invocation of an operation for a class without knowing in advance what provider will perform the operation. Each invocation of the operation may vary from each other invocation, performing different activities by different actors, without the invoker having to understand or even be aware of the way in which the invocation is processed. The operation invocation may be considered a black box, and does not require knowledge of subclass or force the invoker to make decisions about how the invocation is to be processed.

Embodiments disclosed below apply concepts from programming language implementations such as the JAVA® programming language. (JAVA is a registered trademark of Oracle America, Inc.) In these object-oriented languages, there exists a concept called dynamic dispatch. This concept enables run-time modification of the semantics of a function. For example, let us consider, in JAVA, a function called modify defined on a class Controller, and let us consider a sub-class of Controller called SpecificController. The JAVA language semantics state that both classes can define semantics for the modify function that are different from each other. At run-time, the JAVA Virtual Machine will dynamically dispatch to the correct implementation based on the object context in which the function is invoked.

To illustrate dynamic dispatch, let us consider the following code snippets:

```
Controller c1=new Controller( )
Controller c2=new SpecificController( )
c1.modify( )
c2.modify( )
```

The first call to modify invokes the semantics of the Controller class, and the second call invokes the semantics of the SpecificController class. The second call illustrates how dynamic dispatch does not depend on the type of the variable, but on the type of the object on the heap.

The embodiments disclosed below apply these concepts to expose an object-oriented software system where, at run-time, software components can extend semantics of software functions. In addition, the same concept allows dynamic modification of the way the software system distributes software functions. This lets administrators of the software system easily add scale, new resources, and new resource types, without affecting the end-users of the system.

To summarize, various embodiments introduce the concept of a Provider Definition and a Provider. A Provider Definition is metadata about a Provider (an instance of a Provider Definition), which is code that implements the semantics of an operation in the application. The possible operations on every class in the application are modeled and associated with one or more Provider Definitions.

Providers are themselves hosted on Nodes and may be distributed. Providers may be integration points to other management systems.

Class object instances are created by dynamically dispatching the create operation to a Provider associated with the create operation on the class. Other types of operations on class objects are similarly dynamically dispatched. If there are multiple eligible Providers of a given operation, selection of a Provider can be done any number of ways, including by defining selection policies, as described below. Operations on existing class instances are dispatched to the appropriate Provider based upon eligibility, policy, and/or relationships among Providers, in various embodiments.

Because different instances of the same class can have different Providers, the same operation, such as "create" for application software (essentially, install the software), can result in different Providers performing what are quite different processes under the covers. New classes, operations, Provider Definitions, Providers, and Nodes may be introduced without impact to the dynamic dispatching architecture.

The same instance of a class may have several Providers (belonging to one or more Provider Definitions) for the same operation. The dispatch may be based on any kind of selection policy, most likely involving external conditions to the system. For example, an application software instance may be shut down (i.e., the shutdown operation is invoked) in a different way, by a different Provider, based on the current state of the application software relative to the state of the multi-tier application it is part of. A frequent special case of this involves the same instance having different Providers for different operations. One Provider may be able to start and stop the instance, and another may be able to patch it or upgrade it.

The system exposes an object-oriented application programmer interface (API). End users of the system may interact with this API, usually indirectly through a user interface (UI) that in turn uses the API. Any desired UI may be used, and the UI is not further described herein. The API exposes the concepts of objects and object classes. The most common interactions will be to either create a new object given a class, destroy an existing object, or to invoke a function on an object. Object creation and destruction may be exposed as specially named functions, so we may reduce every interaction to a function invocation either on a class or on an object. The system may dynamically dispatch each function invocation differently, depending on the class or object upon which it is invoked.

In normal object-oriented systems, each object class has specific semantics, and all object instances of a given specific class must have the same semantics for every function. Sub-classing is the typical way to allow two different objects to have different semantics of the same function. This is typically called "subtype polymorphism" in computer science. Embodiments disclosed herein add an extra level of indirection to account for the distributed, heterogeneous, and dynamic nature of the software system. A system according to various embodiments may control a heterogeneous set of resources, while exposing a common categorization and semantics for those resources.

In one embodiment, a software system controls compute resources, network resources, and storage resources to manage a cloud. The compute resources may be of different types; for example, some virtual compute resources may be XEN® resources and others VMWARE® resources. (XEN is a registered trademark of Citrix Systems, Inc.; VMWARE is a registered trademark of VMWare, Inc.) However, the management system abstracts the vendor-specific differences behind the object-oriented API, and introduces a class called VirtualGuest, with the functions create, destroy, start, and stop. The semantics of these functions may differ depending on which instance of the class is the subject of the function.

To accommodate this level of flexibility, we introduce the notion of provider definitions and providers. A provider definition represents the code that implements the semantics of one or more functions. A provider represents a specific instance of a provider definition. Each object in the system has all of its functions implemented by one or more providers. A component of the system called the provider registry maintains a mapping of providers and functions is defined by the provider definitions. When handling a request to invoke a function, the system dynamically dispatches to the correct provider based on this mapping.

Various embodiments may implement various ways for the provider registry to select a provider dynamically for a function call. In some embodiments, the provider registry may determine a set of eligible providers for a call, and pick one of them by applying a policy through a policy engine. Policies may be based on many kinds of conditions, including service level agreements (SLA), location, quality of service (QOS), etc. The policy engine itself may be modeled as a provider of advice, and therefore the selection of an appropriate policy may be itself dynamically dispatched. In other embodiments, the system may determine a set of eligible providers by organizing providers into peer sets, groups of providers that collaborate to provide semantics to a set of objects that they own.

We have so far seen how the mechanism of dynamic dispatch has enabled the management of a heterogeneous set of resources with a common API. We now summarize how the concept of Provider allows us to use these concepts to enable a more scalable and flexible software topology. A normal approach in object-oriented systems is to enable extension via sub-classing. This has the disadvantage of requiring that the end user become aware of the various sub-classes, or requires use of various design patterns to ignore the sub-classes. Concerning a class that represents a resource which has multiple dimensions of heterogeneity, sub-classing imposes an extensive, repetitive class hierarchy. With the Provider approach, we need merely add a new Provider Definition, and create new Providers to manage a new kind of resource under the same class, without the addition of any sub-classes.

As mentioned above, most object-oriented systems allow the extension of the system semantics via end-users adding new classes to the system. Embodiments disclosed herein need not require this (through use of Provider Definitions for existing classes). However, in some embodiments, end users may want to add entirely new types to the system. For example, in one embodiment, a software system may expose telemetry information about objects named VirtualClusters, in the form of a class representing the telemetry. An end user may want to expose telemetry information that only they understand how to compute. They may do this by adding a new class, and a new relationship between the VirtualCluster class and their new class. In addition, they may register a Provider Definition that implements the semantics of their class (i.e. that can compute the telemetry information.) Once this registration is complete, the new telemetry class is indistinguishable from any other object in the system. The dynamic-dispatch notions continue to work using exactly the same syntax as any other class that was part of the original system.

The techniques described above are different from event-based systems. Event-based systems exhibit some of the same multi-node aspects, as well as the benefits of not forcing sub-classing on the model. However, event-based systems inherently require special design patterns for client code, as most common programming languages are not inherently event-based. The disclosed approach has all of the benefits of an event-based approach with the benefits of a more common object-oriented language approach. The advantages include (a) control of heterogeneous resources without forcing sub-classing, which leads to a more flexible API; (b) seamlessly adding scale to a software system without affecting end users; and (c) seamlessly reconfiguring the software system topology without affecting end users. While one use of such a software system may be a system for managing a distributed network of information technology (IT) resources, the techniques described herein are not limited to IT resource management systems, but may be used on any distributed software system.

FIG. 1 is a flowchart illustrating a dynamic dispatch technique at a high level according to one embodiment. In block 100, a client program invokes an operation on an object through an API in which the client program indicates the operation to be performed and the object on which it is to be performed. Other information may be provided to the API as specified by the operation definition in the class. The API bundles the invocation information provided by the client and passes the information to provider system to determine the actual performer of the operation.

In block 110, the provider system looks up the object class definition for the operation on the specified object. In block 120, the provider system determines what providers are registered as providing the requested operation for the relevant object class.

In block 130, the provider system selects which registered provider should be requested to perform the operation. If more than one provider can perform the operation for the requested class, then the provider system uses a technique for choosing which of the plurality of possible providers should perform the operation, using techniques described in more detail below. In block 150, the selected provider is passed the invocation to perform the requested operation.

Figure 2:
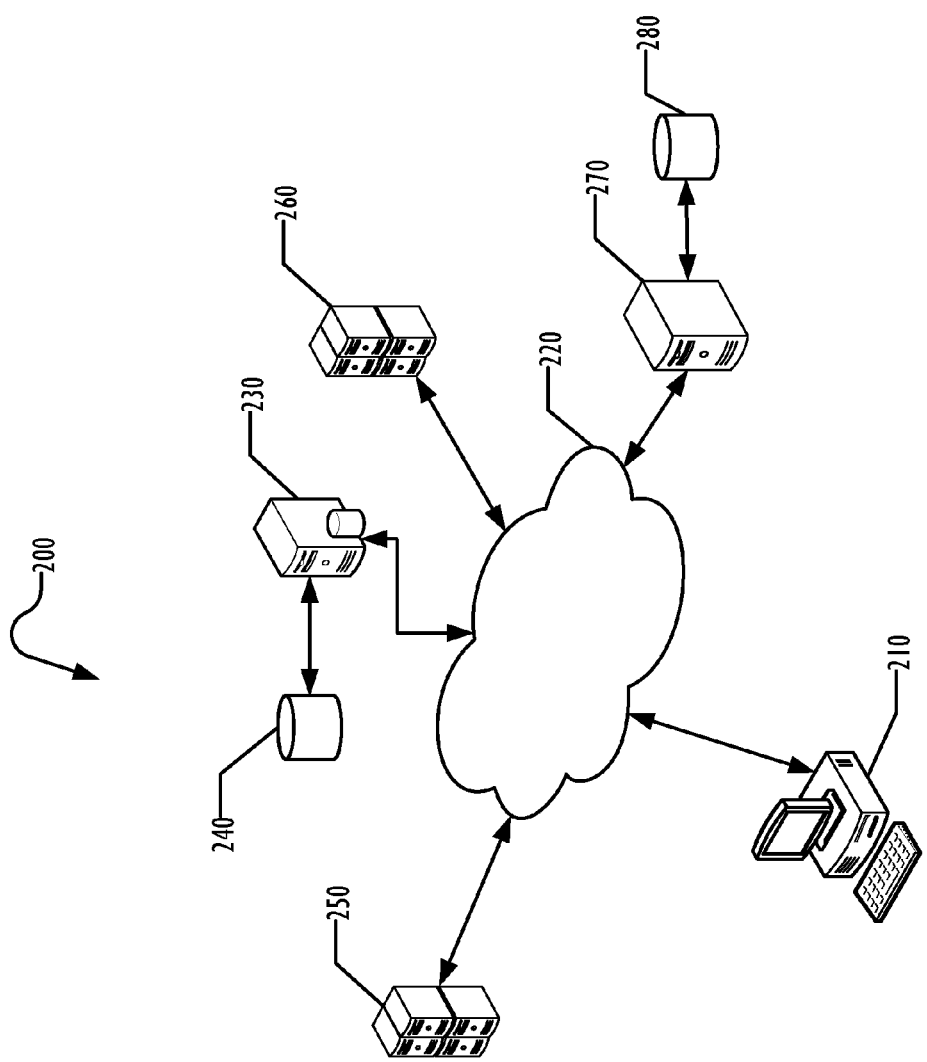
FIG. 2 is a block diagram of a network of computers providing a dynamic dispatch technique according to one embodiment.

In one embodiment, the provider system comprises software provided on multiple computers, as illustrated in the block diagram of FIG. 2. The provider system includes a provider registry, class metadata, provider definition metadata, provider instance metadata, and software that will chose how to dispatch calls to providers. Software executing on computer 210 invokes an operation on an object by using an API available to such software. The API call results in communicating across network 222 with a provider registry software executing on computer 230, which has access to a database of provider definitions 240. The provider registry 230 queries the provider definitions 240 to determine what registered provider(s) can provide the desired operation. The provider database 240 may indicate to the provider registry 230 that provider software executing on computer 250 and provider software executing on computer 260 are both registered as providers of the desired operation. The provider registry 230 may then use any desired technique to select between providers 250 and 260. In one example, the provider registry 230 decides that provider 250 should provide the operation, so provider registry 230 passes the request to provider 250 for execution.

If the provider database 240 indicates that only a single provider is registered for providing the requested operation, then the provider registry 230 may pass the request to that registered provider for execution.

In one embodiment, provider registry 230 may request advice from advisor software running on server 270 on which of provider 250 and 260 should be selected by the provider registry 230 to perform the requested operation. The advisor software 270 may use policies or rules stored in a policy database 280 to make the decision and respond to the provider registry 230. Some embodiments of a provider system 200 may omit the advisor software 270. In one embodiment, the identity of the advisor software 270 is also determined by the provider registry 230 using the API, with the advisor software 270 registered as providing the advice operation in the provider database 240.

The provider definition database 240 may be implemented in any convenient or desired way, including structured databases that are controlled by a database management engine, flat files, or any other type of data storage. In some embodiments, the provider definition database 240 may be an in-memory data structure of the provider registry 230.

Figure 3:
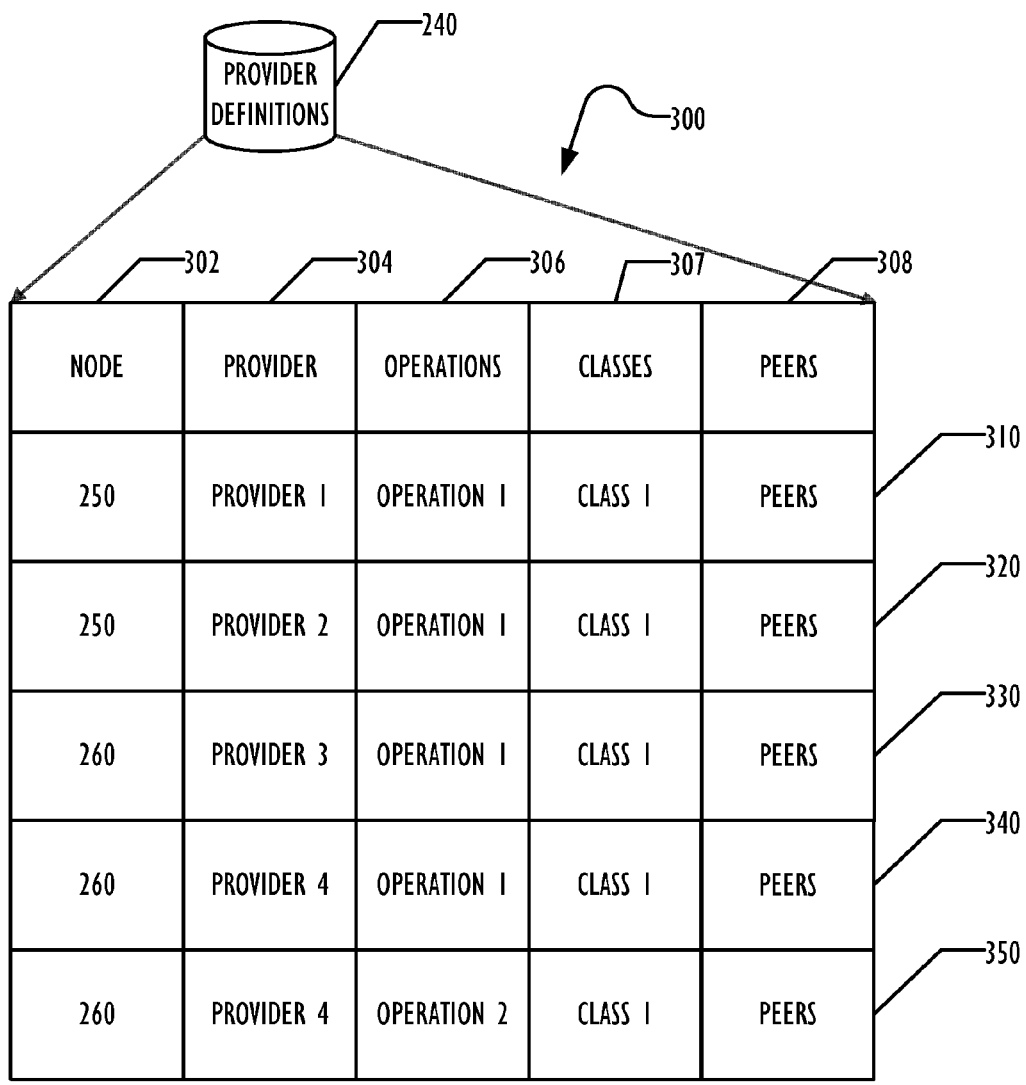
FIG. 3 is a block diagram illustrating a table storing provider definitions according to one embodiment.

An example embodiment of provider definition database 240 is illustrated in block diagram form by FIG. 3. In this example, the provider definition database 240 is represented as a table comprising rows 310-350 and columns 302-308. The database table structure of FIG. 3 is illustrative and by way of example only, and any other table structures or other data structures may be used as desired. In the example of FIG. 3, column 302 stores information about a node of a network hosting a provider. Column 304 identifies the provider. Column 306 identifies an operation provided by the provider identified in column 304. Column 307 identifies the class on which the operation operates. (Although in this example, only a single class is identified, any number of classes may be identified in column 307.) Column 308 identifies peers of the provider identified in column 302.

In one embodiment, the provider registry 230 also keeps track of which provider created the object on which the operation is to be performed, and by default, that provider is given the opportunity to provide the operation. In a further embodiment, a provider may be queried by the provider registry 230 to determine if that provider can provide the operation. This allows a provider that may be overloaded or where there is some other reason that provider should not or cannot provide to the operation to refuse a request by the provider registry 230 to provide the operation. In one embodiment, the provider may locate a substitute provider for the operation by making its own call to the API. In other embodiments, the provider may simply refuse the request to perform the operation, causing the provider registry 230 to make another selection.

In one embodiment, the column 308 keeps track of peers of a provider. If the provider originally selected by the provider registry 230 does not handle the operation on that object, then one of the peers of that provider may be chosen, by random choice or otherwise, to provide the operation. This embodiment also allows for situations in which the provider that created the object does not handle the requested operation on that object. Thus, a creator of an object is not required to handle all operations performed on that object. In other embodiments described below, trees of related providers may be employed.

In the example table 300 of FIG. 3, row 310 corresponds to provider 1 executing on node 250 of FIG. 2 and providing operation 1. Provider 2 also provides operation 1 on node 250 of FIG. 2, as indicated by row 320, illustrating that a single node may have a plurality of providers for the same operation.

Row 330 and row 340 illustrate that providers on other nodes, in this case node 260 of FIG. 2, can provide the same operation as provided by the providers registered in rows 310 and 320 on node 250. Rows 340 and 350 illustrate that a single provider can registered as providing more than one operation.

Although illustrated as a single table in FIG. 3, the provider definitions of the provider database 240 may be stored in multiple tables as desired.

Dynamic dispatch in the context of a programming language is normally applied on a single node. In the system described herein, each provider is mapped to a node, intrinsically making the operation's dynamic dispatch distributed. Thus, to add more scale to the software system, we need merely add new nodes and create new providers on those new nodes. The provider registry 230 automatically starts dispatching to the correct providers, including the newly added providers. Furthermore, merely by modifying the provider registry 230, the network topology of the software system itself can be reconfigured at runtime.

Figure 4:
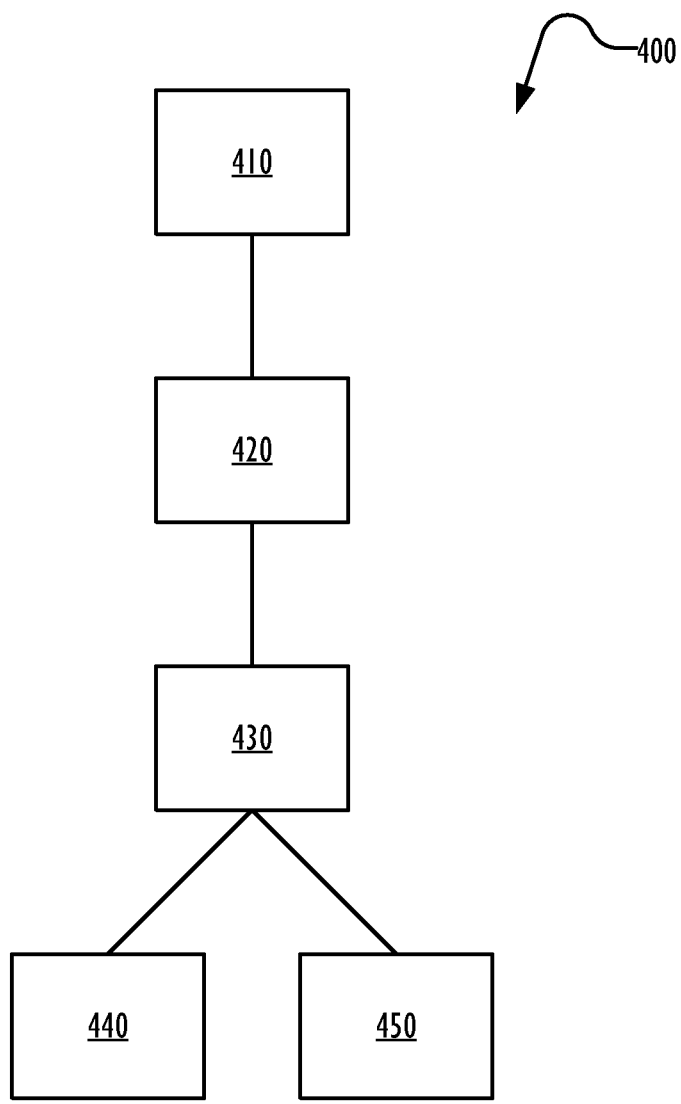
FIG. 4 is a block diagram of a tree of providers according to one embodiment.

In one embodiment, providers may be linked in parent-child relationships that may be used by the provider registry 230. FIG. 4 is a block diagram illustrating an example tree 400 of parent-child provider relationships. Provider 410 is the parent of all other providers in the tree 400. Provider 420 is the child of provider 410 and the parent of provider 430. Provider 430 is the parent of peer providers 440 and 450.

Some providers in a tree of providers may be registered as providing a given operation on an object, but some providers in the tree may not be so registered. In one embodiment, if a parent provider is selected by the provider registry 230 as providing an operation on an object and the parent provider (for whatever reason) does not wish to handle the operation, the parent provider may use the API to request a substitute provider for the operation from its children, indicating to the API that a search should begin at that point in the provider tree 400.

Figure 5:
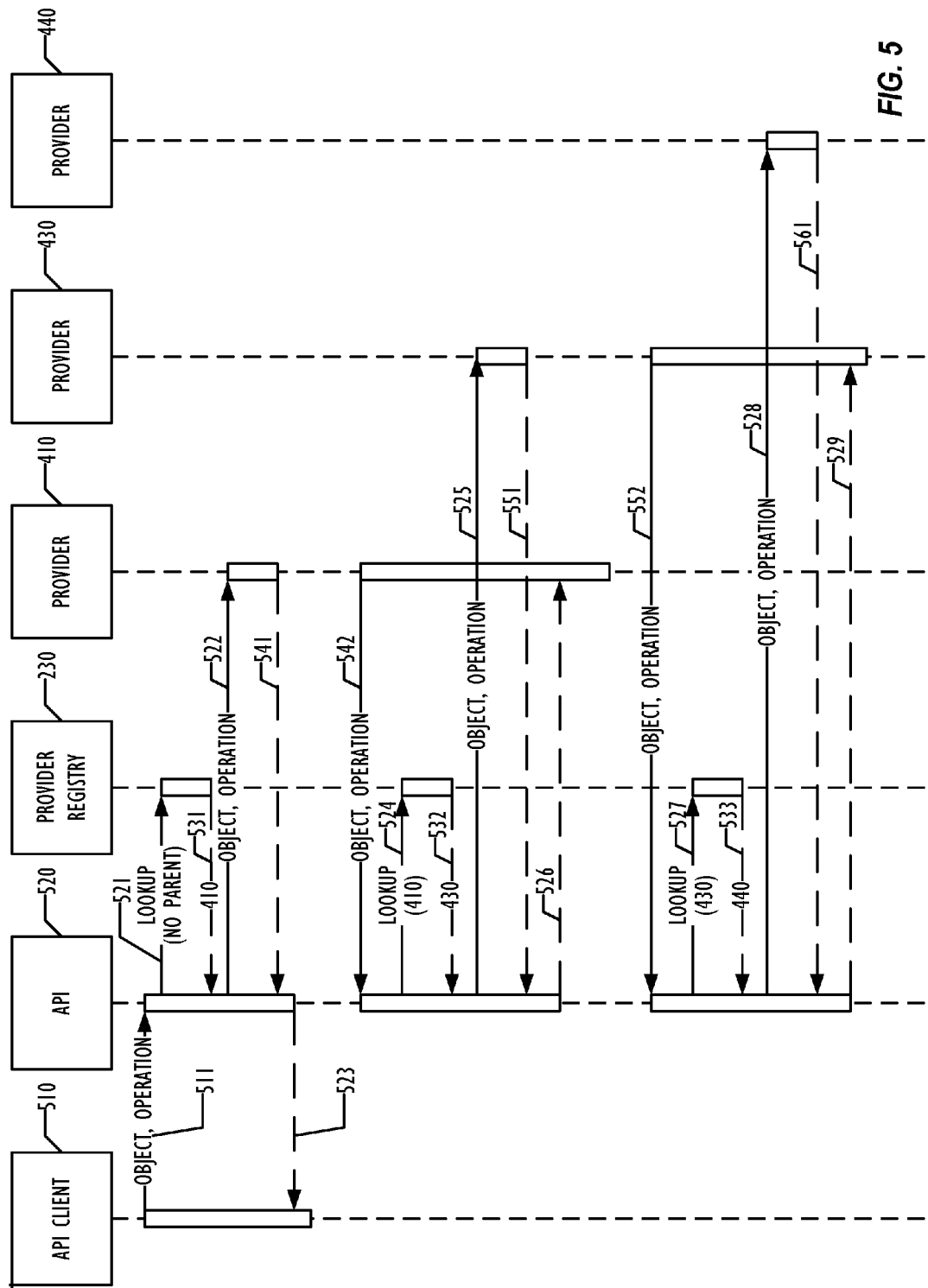
FIG. 5 is a graph illustrating execution of a dynamically dispatched request according to one embodiment.

FIG. 5 is a graph illustrating a sequence of calls and responses according to an embodiment that includes the tree of providers of FIG. 4. The sequence begins when a client 510 makes a call 511 to the API 520, specifying an object and an operation that is to be performed on the object. API 520 requests a lookup 521 of a provider from the provider registry 230, indicating the object and operation to be performed, and specifying no parent limitation. Other parameters may be provided on the lookup request 521 as desired.

The provider registry 230 responds to the lookup request 521 based on the provider definitions 240, indicating that provider 410, which is registered as providing the operation on the object, should provide the operation on the object. The API 520 may then send request 522 to provider 410 to perform the operation on the object. The provider 410 acknowledges the request in response 541 and the API acknowledges the original request from client 510 in response 523. The operation may then be performed on the object asynchronously with the original request 511.

In this situation, the provider 410 does not wish to provide the operation on the object. This may be for any reason, including overloading of the provider 410 or any other reason whatsoever. Therefore, the provider 410 initiates a request 542 to the API 520 to find a substitute provider.

The API 520 again requests the provider registry 230 in request 524 to identify a provider. In request 524, the API 520 instructs the provider registry 230 to limit the search for a provider to children of provider 410. Referring back to the provider tree of FIG. 4, provider 420 is the child of provider 410, but is not registered as providing the desired operation on the object. Therefore, the provider registry 230 traverses the tree 400 to find the child of provider 420, provider 430, that is registered as providing the desired operation on the object. The provider registry 230 then response back to the API 520 indicating that provider 430 is the selected provider. The API 520 then sends request 525 to provider 430 requesting the operation on the object. Provider 430 acknowledges the request 525 with response 551 and the API 520 response to the request 542 from provider 410 with response 526.

Provider 430 also does not wish to provide the operation on the object, and initiates request 552 through the API 520 to find a substitute provider. The API 520 then sends lookup request 527 to the provider registry 230 specifying that the provider search should be limited to children of provider 430. Both of the children 440 and 450 of provider 430 are registered to provide the operation of the object, and in this instance, the provider registry 230 selects provider 440 and responds with response 533 to the API 520 indicating provider 440 is to provide the operation on the object.

The API 520 then sends request 528 to provider 440. Provider 440 acknowledges the requests with response 561 back to the API 520, which then responds to provider 430 with response 529. The provider 440 can provide the operation on the object and performs that operation asynchronously (not shown in FIG. 5).

In one embodiment, the techniques described above may be implemented in a distributed management system. Different nodes in the management system may provide management functions as operations on objects in the management system. The techniques described herein, however, are not limited to management systems and may be used in any distributed object-oriented software system.

Figure 6:
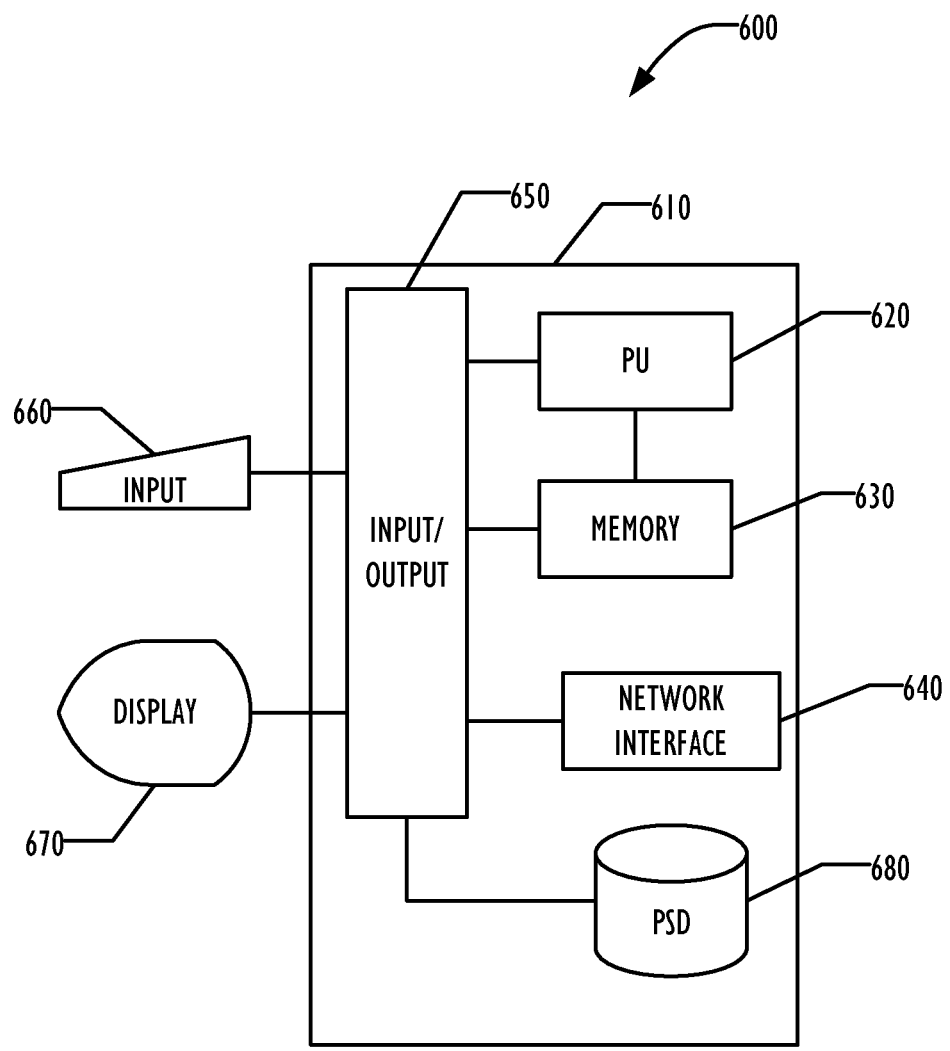
FIG. 6 is a block diagram illustrating a computing device capable of performing a dynamic dispatch technique according to one embodiment.

Referring now to FIG. 6, an example computer FIG. 600 for use in providing a provider registry 230 is illustrated in block diagram form. Example computer FIG. 600 comprises a system unit FIG. 610 which may be optionally connected to an input device or system FIG. 660 (e.g., keyboard, mouse, touch screen, etc.) and display FIG. 670. A program storage device (PSD) FIG. 680 (sometimes referred to as a hard disc) is included with the system unit FIG. 610. Also included with system unit FIG. 610 is a network interface FIG. 640 for communication via a network with other computing and corporate infrastructure devices (not shown). Network interface FIG. 640 may be included within system unit FIG. 610 or be external to system unit FIG. 610. In either case, system unit FIG. 610 will be communicatively coupled to network interface FIG. 640. Program storage device FIG. 680 represents any form of non-volatile storage including, but not limited to, all forms of optical and magnetic, including solid-state, storage elements, including removable media, and may be included within system unit FIG. 610 or be external to system unit FIG. 610. Program storage device FIG. 680 may be used for storage of software to control system unit FIG. 610, data for use by the computer FIG. 600, or both.

System unit FIG. 610 may be programmed to perform methods in accordance with this disclosure (an example of which is in FIG. 1). System unit FIG. 610 comprises a processor unit (PU) FIG. 620, input-output (I/O) interface FIG. 650 and memory FIG. 630. Processing unit FIG. 620 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory FIG. 630 may include one or more memory modules and comprise random access memory (RAM), read only memory (ROM), programmable read only memory (PROM), programmable read-write memory, and solid-state memory. One of ordinary skill in the art will also recognize that PU FIG. 620 may also include some internal memory including, for example, cache memory.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of dynamically dispatching a request to perform an operation on an object in an object-oriented software system, comprising:

receiving, by a provider registry, a request from a client software executing on a client computer, the request identifying an object and an operation to be performed on the object;

querying, by the provider registry, a database storing provider definitions to determine which providers to perform the operation on the object, the provider definitions including a list of providers, and for each provider, the provider definitions identifying a node that hosts a respective provider, at least one operation provided by the respective provider, and at least one object that is the subject of the at least one operation;

selecting, by the provider registry, a first provider registered as performing the operation on the object based on the provider definitions including determining that the operation to be performed on the object is included within a provider definition corresponding to the first provider; and sending, by the provider registry, the request to perform the operation on the object to the node corresponding to the first provider for execution by the first provider.

2. The method of claim 1, wherein the provider definitions include provider relationship information identifying a relationship between the first provider and at least one second provider.

3. The method of claim 1, further comprising:

receiving, by the provider registry, a request for a substitute provider to perform the operation on the object, from the first provider;

querying, by the provider registry, the database storing the provider definitions to determine which other providers to perform the operation on the object;

selecting, by the provider registry, a second provider as the substitute provider to perform the operation on the object based on the provider definitions including determining that the operation to be performed on the object is included within a provider definition corresponding to the second provider, the second provider being different from the first provider; and sending, by the provider registry, the request to perform the operation on the object to the node corresponding to the second provider for execution by the second provider.

4. The method of claim 3, wherein the second provider is a child of the first provider.

5. The method of claim 3, wherein the second provider is a peer of the first provider.

6. The method of claim 1, wherein the selecting, by the provider registry, a first provider registered as performing the operation on the object comprises:

identifying a plurality of providers registered as performing the operation on the object based on the provider definitions including determining that the operation to be performed on the object is included within a provider definition for each of the plurality of providers; and selecting the first provider from the plurality of providers.

7. The method of claim 6, wherein the selecting the first provider from the plurality of providers comprises:

evaluating a policy to determine which of the plurality of providers should perform the operation on the object.

8. The method of claim 6, wherein the selecting the first provider from the plurality of providers comprises:

sending, by the provider registry, a request for advisor information for determining which provider among the plurality of providers is to perform the operation on the object, over a network, to an advisor executing on a computer remote from the provider registry;

receiving, by the provider registry, the advisor information, over the network, from the advisor, the advisor information identifying the first provider among the plurality of providers as the provider to perform the operation on the object; and selecting, by the provider registry, the first provider as identified by the advisor information.

9. The method of claim 6, wherein the selecting the first provider from the plurality of providers comprises:

selecting the first providers from the plurality of providers randomly.

10. The method of claim 6, wherein each provider of the plurality of providers performs the operation on the object differently than each other provider of the plurality of providers.

11. The method of claim 1, further comprising:

registering, by the provide registry, the first provider as performing the operation to be performed on the object including receiving information to construct the provider definition corresponding to the first provider.

12. A networked computer system comprising:

at least one processor; and a non-transitory computer readable medium including instructions executable by the at least one processor that are configured to implement;

a provider registry configured to receive a request from a client software executing on a client computer, the request identifying an object and an operation to be performed on the object; and a database configured to store provider definitions, the provider definitions including a list of providers, and for each provider, the provider definitions identifying a node that hosts a respective provider, at least one operation provided by the respective provider, and at least one object that is the subject of the at least one operation, the provider registry configured to query the database to determine which providers to perform the operation on the object as specified in the request, the provider registry configured to select a first provider registered as performing the operation on the object based on the provider definitions including determining that the operation to be performed on the object is included within a provider definition corresponding to the first provider, the provider registry configured to send the request to perform the operation on the object to the node corresponding to the first provider for execution by the first provider.

13. The networked computer system of claim 12, the provider registry configured to receive a request for a substitute provider to perform the operation on the object from the first provider, the provider registry configured to query the database storing the provider definitions to determine which other providers to perform the operation on the object, the provider registry configured to select a second provider as the substitute provider to perform the operation on the object based on the provider definitions including determining that the operation to be performed on the object is included within a provider definition corresponding to the second provider, the second provider being different from the first provider, and the provider registry configured to send the request to perform the operation on the object to the node corresponding to the second provider for execution by the second provider.

14. The networked computer system of claim 12, further comprising:

a policy engine configured to evaluate a policy to determine which of the plurality of providers should perform the operation on the object.

15. A non-transitory computer readable medium including instructions, when executed by at least one processor, are configured to:
- receive a request from a client software executing on a client computer, the request identifying an object and an operation to be performed on the object;
- query a database storing provider definitions to determine which providers to perform the operation on the object, the provider definitions including a list of providers, and for each provider, the provider definitions identifying a node that hosts a respective provider, at least one operation provided by the respective provider, and at least one object that is the subject of the at least one operation;
- select a first provider registered as performing the operation on the object based on the provider definitions including determining that the operation to be performed on the object is included within a provider definition corresponding to the first provider; and
- send the request to perform the operation on the object to the node corresponding to the first provider for execution by the first provider.

16. The non-transitory computer readable medium of claim 15, wherein the provider definitions include provider relationship information that identifies any peers associated with each respective provider.

17. The non-transitory computer readable medium of claim 15, wherein the instructions include instructions to:
- receive a request for a substitute provider to perform the operation on the object from the first provider;
- query the database storing the provider definitions to determine which other providers to perform the operation on the object;
- select a second provider as the substitute provider to perform the operation on the object based on the provider definitions including determining that the operation to be performed on the object is included within a provider definition corresponding to the second provider, the second provider being different from the first provider; and
- send the request to perform the operation on the object to the node corresponding to the second provider for execution by the second provider.

18. The non-transitory computer readable medium of claim 15, wherein the instructions to select a first provider registered as performing the operation on the object comprises:
- identify a plurality of providers registered as performing the operation on the object based on the provider definitions including determining that the operation to be performed on the object is included within a provider definition for each of the plurality of providers; and
- select the first provider from the plurality of providers.

19. The non-transitory computer readable medium of claim 18, wherein the instructions to select the first provider from the plurality of providers includes instructions to:
- evaluate a policy to determine which of the plurality of providers should perform the operation on the object.

20. The non-transitory computer readable medium of claim 18, wherein the instructions to select the first provider from the plurality of providers comprises instructions to:
- send a request for advisor information for determining which provider among the plurality of provider is to perform the operation on the object, over a network, to an advisor executing on a computer remote from the provider registry;
- receive the advisor information, over the network, from the advisor, the advisor information identifying the first provider among the plurality of providers as the provider to perform the operation on the object; and
- select the first provider as identified by the advisor information.

* * * * *

UNITED STATES PATENT AND TRADEMARK OFFICE
CERTIFICATE OF CORRECTION

| | |
|---|---|
| PATENT NO. | : 8,589,471 B2 |
| APPLICATION NO. | : 13/074540 |
| DATED | : November 19, 2013 |
| INVENTOR(S) | : Jonathan Whitney et al. |

It is certified that error appears in the above-identified patent and that said Letters Patent is hereby corrected as shown below:

In the Claims

In column 10, line 16, in claim 11, delete "provide" and insert -- provider --, therefor.

In column 10, line 24, in claim 12, delete "implement;" and insert -- implement: --, therefor.

Signed and Sealed this
Twenty-sixth Day of August, 2014

Michelle K. Lee
*Deputy Director of the United States Patent and Trademark Office*